United States Patent Office 3,356,629
Patented Dec. 5, 1967

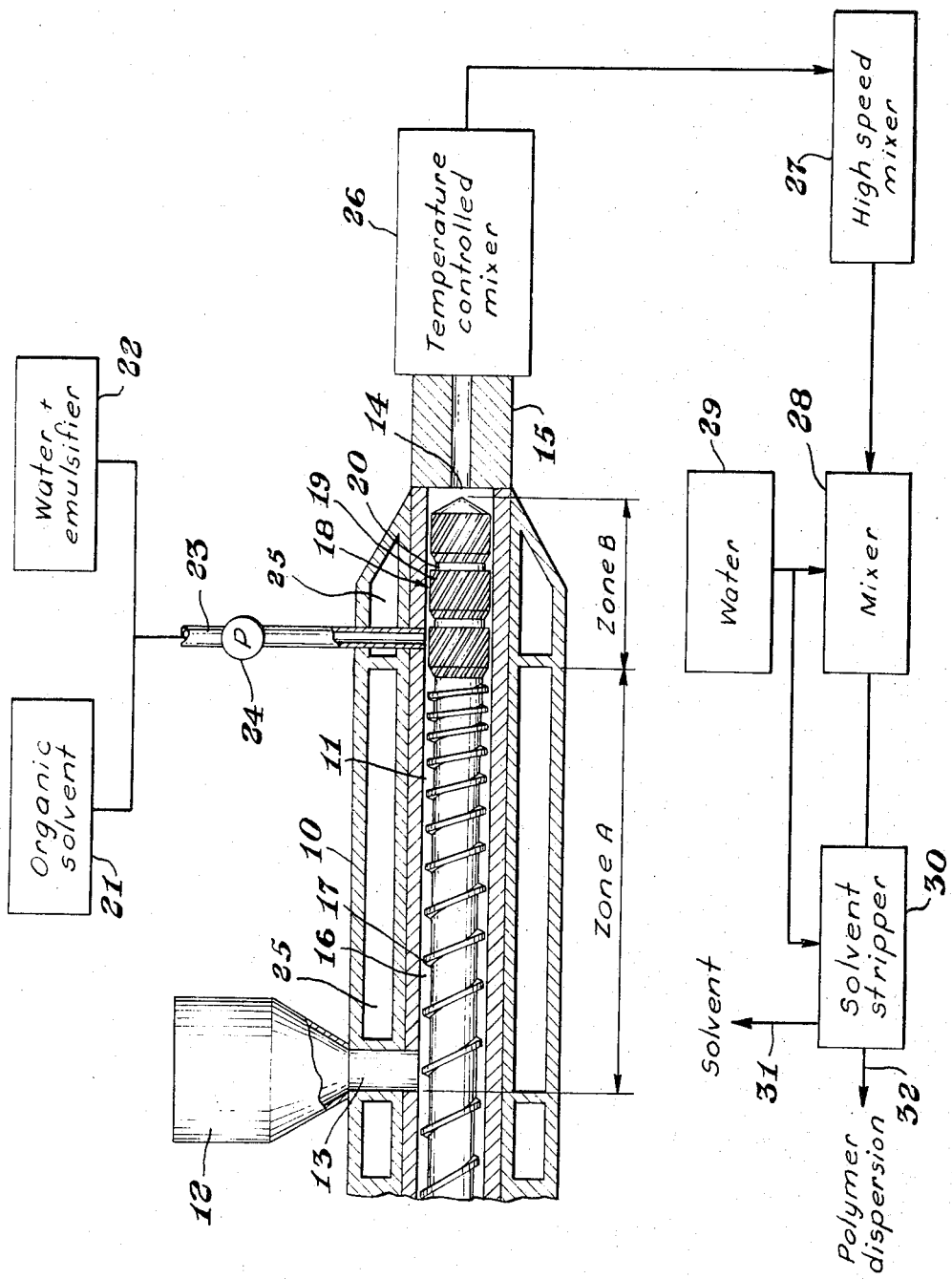

3,356,629
METHOD FOR PREPARING AQUEOUS DISPERSIONS OF HIGH MOLECULAR WEIGHT OLEFIN POLYMERS
William F. Smith, Lake Jackson, and Lon Truman Smith, Dallas, Tex., assignors to The Dow Chemical Company, Midland, Mich., a corporation of Delaware
Filed Dec. 28, 1964, Ser. No. 421,402
9 Claims. (Cl. 260—29.6)

This invention relates to a continuous process for preparing stable aqueous dispersions of high molecular weight polymeric materials.

It is known to the art that certain high molecular weight polymeric materials, such as polymers and copolymers of substances such as ethylene, propylene and butylene and copolymers such as ethylene/ethyl acrylate and ethylene/vinyl acetate have found utility in a great many commercial applications. For example, high molecular weight polyethylene in the range of 20,000 to 30,000 Staudinger has been found useful as coating materials and a diversity of shaped articles such as fibers, bottles, etc. Copolymers of ethylene and vinyl acetate or ethyl acrylate have found wide utility as adhesives and coating materials.

One major hinderance to a more widespread industrial use of these high molecular weight polymeric materials is that it is difficult to form emulsions or dispersions of them in aqueous media.

In order to obtain such dispersions, it has been the practice in the art to first dissolve the polymer in a hot solvent bath and upon dissolution of the polymer to add an aqueous solution containing an emulsifying agent to form an emulsion. The solvent is then vaporized from the aqueous emulsion to provide an aqueous dispersion of the polymer in the aqueous medium. Such procedures are slow, necessarily batchwise and thus expensive.

In accordance with the present invention, stable aqueous dispersions of high molecular weight polymeric materials are prepared by a process which comprises feeding the starting polymer which is to be dispersed into a multizone extruder having, in sequence, a zone for melting, pumping and metering the polymer, a mixing zone, and a discharge zone, melting, pumping and metering the polymer and continuously passing it to the mixing zone, injecting into the mixing zone a pressurized liquid mixture of a solvent for the polymer and an aqueous solution of an emulsifying agent, admixing the polymer, the solvent therefor, and the aqueous solution of emulsifier in the mixing zone, passing the resulting emulsion mixture through the discharge zone into a temperature control and mixing zone, further mixing the emulsion while maintaining the temperature at from about 70° to about 120° C. and subsequently removing the organic solvent from the emulsion by volatilization leaving a dispersion of the polymer in the aqueous medium.

The polymer dispersions so obtained are relatively concentrated in the order of 40 percent by weight of the high molecular weight polymer. If necessary or desired, the dispersion may be subjected to a further devolatilization to remove water and concentrate the polymer content, i.e. the solids content of the dispersion.

By the term "high molecular weight," reference is made to Staudinger molecular weights ranging from about 15,000 to about 45,000.

When operating according to the practice of the present invention in a multistage screw extruder, the high molecular weight polymer melts alone in the metering pumping zone of the extruder and is compressed and forced forward by the operation of the screw into the mixing zone of the extruder wherein the polymer is admixed and dispersed in the liquid mixture which is pumped, under pressure, into the mixing zone. The thus prepared emulsion upon discharge from the extruder is further mixed and cooled to about 70° to about 120° C. during mixing. After the temperature controlled mixing the emulsion may undergo further mixing in high shear mixing equipment to insure adequate dispersion of the polymer.

In the formation of the polymer dispersions of the present invention, it is desirable that all the organic solvent be stripped from the dispersion since residual quantities of the solvent result in unstable emulsions. Vacuum distillation is a preferred means to effect volatilization of the solvent although direct distillation at atmospheric pressure is also effective.

To obtain dispersions suitable for commercial applications, the solids content of the dispersion may be adjusted by the addition of water before or after the organic solvent is removed from the dispersion.

Conventional extruders usually consist of a heated metal cylinder containing a closely fitted rotatable helical screw. A multizone extruder, as the term is used herein, is an extruder apparatus comprising a hollow cylinder having an axially spaced feed inlet and outlet openings for the materials fed to it and a rotatable multizone screw disposed within the cylinder and extending from the feed inlet to the outlet. The screw is divided into at least two zones including a metering pumping zone wherein the screw in the extruder cylinder is constructed of helical flights for compressing and conveying feed material forward and a mixing zone wherein a torpedo or other shaped coaxial extension of the screw forms a mixing head which promotes thorough blending and homogenizing. Illustrative examples of such multizone screws are the abruptly increasing root, or so-called "nylon" metering screw, and the diminishing pitch screw with a helically fluted torpedo, or so-called "Dulmage" screw described in U.S. 2,453,088.

The figure represents a schematic cross-sectional view of one form of an apparatus wherein the process of the present invention may be carried out. Referring now the the figure, the apparatus includes a housing 10, provided with a generally elongated cylindrical inner cavity 11 which is in communication with feed hopper 12 by means of an inlet opening 13 and with a discharge orifice 14 in an extruder die, shown generally at 15. A multizone helically threaded screw, shown generally at 16, is rotatably mounted within the cavity 11. The screw 16 is provided with two main zones or sections, denoted A and B. Zone A of the screw 16 represents the metering pumping section of the screw. It may be provided with helical flights 17 which progress from the feed hopper opening area 13 of the screw through zone A with a diminishing lead on successive flights of the screw. The flights 17 terminate at the end of zone A of the screw 16 at which point the screw is provided with an elongated cylindrical torpedo 18 secured coaxially to the screw 16 and fitting rotatably within and occupying from about ¼ to ½ of the cavity 11. The torpedo 18 is provided with a plurality of equally spaced helical grooves 19 with rounded bottoms in its cylindrical surface. The torpedo 18 is also provided with a plurality of spaced neck-like circumferential constrictions 20 along the torpedo of the same depth as the helical grooves 19, the constrictions 20 representing abrupt decreases in diameter of the torpedo 18 at their feed ends and gradual returns to the original diameter at their discharge or forward ends, the combined capacities of the helical grooves 19 and circumferential constrictions 20 being at least as great as the delivery capacity of the screw 16. A more detailed description of the torpedo of the type above described may be found in U.S. 2,453,088. The area of the cavity 11 occupied by the torpedo 18 defines zone B of the screw 16 and represents the mixing zone of the screw 16.

The cavity 11 is also in communication with containers 21 and 22 by means of conduit means 23, the conduit means 23 being provided to inject, under pressure, organic solvent solutions and aqueous emulsifier solutions from the separate containers 21 and 22 respectively to zone B at a point immediately adjacent to zone A. Conduit means 23 is equipped to inject mixtures of these solutions under pressure by any suitable pumping means 24, such as for example, a reciprocating pump, gear pump or other type of positive displacement pump.

The housing 10, is heated by steam in chambers 25 and the high molecular weight polymer in the form of granular particles is fed by gravity to screw 16 in zone A from feed hopper 12. The screw 16 and its coaxial extension, torpedo 18, are set in motion by a motor-driven gear (not illustrated) in the conventional manner. The polymer is compressed and melted in the metering pumping zone and is advanced by the screw 16 toward the torpedo 18 in the mixing zone of the extruder. The polymer is generally heated while being forced forward in the metering pumping zone of the extruder to a temperature of 110° C. to 150° C. in the extruder before reaching the mixing zone and at this temperature develops a pressure of about 50 to 2500 p.s.i. In the mixing zone, the polymer is intermixed and dispersed in the liquid mixture. The dispersed polymer is thoroughly and homogenously mixed by the torpedo 18. The homogeneous dispersion is discharged through discharge orifice 14 which may be heated into a temperature controlled mixing means 26, such as a continuous mixer or other suitable machine wherein the temperature of the dispersion is cooled and maintained at a temperature of about 70° to about 120° C. while the dispersion is continually mixed. After mixing for a time sufficient to obtain proper cooling and intimate dispersion, generally from about 1 to about 10 minutes, depending on the dispersion components, the dispersion is passed from the temperature controlled mixing means into a high speed mixer 27, such as a colloid mill, homogenizer or other intensive mixer wherein the dispersion is intensively mixed. The temperature of the dispersion at this point must be sufficiently low to prevent escape of the solvent-water dispersion medium as an azeotropic distillate.

The dispersion may optionally be passed to mixer 28 wherein the consistency and solids content of the dispersion may be adjusted by adding water from tank 29. The dispersion is then passed to solvent stripper 30 wherein the organic solvent is removed via line 31 by vacuum distillation and the polymer dispersion is withdrawn via line 32. Water from tank 29 is added to adjust the solids content of the resulting dispersion, if required. Generally, dispersions having a solids content of 40 to 50 percent are considered most advantageous for industrial applications.

Polymeric compounds which may be dispersed in the process of the present invention include polymers and copolymers of olefinically unsaturated aliphatic hydrocarbons containing from 2 to 10 carbon atoms. Illustrative examples of such olefin hydrocarbons are ethylene, propylene, n-butylene, isobutylene, the pentenes, the hexenes and the like. Ordinarily, the olefinic hydrocarbons are of the monoolefinic type containing the unsaturated bond in the α-position. In addition, copolymers of the olefinically unsaturated hydrocarbons with copolymerizable compounds having reactive side groups such as copolymers of ethylene and vinyl acetate, ethylene and vinyl salicylate and copolymers of the olefinically unsaturated hydrocarbons with acrylates such as copolymers of ethylene and methyl, ethyl or butyl acrylate, isobutyl acrylate, β-hydroxyethyl acrylate, β-hydroxyethyl methacrylate, β-hydroxypropyl acrylate or copolymers of ethylene and acrylic and methacrylic acids, may also be beneficially dispersed by the process of the present invention.

Solvents which may be employed in the practice of the present invention are preferably materials which are not miscible or only slightly miscible with water and are inert to the components of the emulsion. Suitable solvents include hydrocarbons or halogenated derivatives thereof, for example, aromatic hydrocarbons such as benzene, toluene, or xylene, aliphatic hydrocarbons such as hexane or halogenated hydrocarbons such as trichloroethylene.

The dispersing or emulsifying agent is dissolved in water prior to its being intermixed with the organic solvent.

Any of a wide variety of emulsifying agents, including the anionic, cationic, and non-ionic types may be employed in the practice of the present invention. The anionic emulsifying agents are very much preferred, and agents such as the sodium salts of the long-chain alkyl sulfates, such as sodium lauryl polyethoxysulfate and the sodium salts of aromatic sulfonates such as sodium dodecyl benzene and the like are particularly useful. Emulsifying agents should be present in the aqueous mixture being pumped in amounts ranging from 2 percent to 20 percent, preferably from 4 to 8 percent based on the weight of the dispersed polymer.

In addition, protective colloid materials such as methyl cellulose, carboxymethyl cellulose, sodium polyacrylate, polyvinyl alcohol, are dissolved along with the emulsifying agent in the water prior to its addition to the extruder.

The amount of protective colloid may be varied from 0.45 to 1.5 percent based on the weight of the polymer to be dispersed.

The pressure at which the water-organic solvent mixture is injected into the extruder may vary from 50 to 2500 p.s.i. The water-organic solvent mixture is heated to a temperature of 90° to 180° C. in the mixing section of the extruder.

In the preparation of the dispersions of the present invention, the ratio of water to organic solvent employed in the liquid mixture injected into the mixing section of the plastics extruder may vary from 1:4 to 1:10 by weight depending on the density of the organic solvent used. The ratio of the liquid mixture to the polymer to be dispersed may vary from 2.5:1 to 6:1.

This invention is further illustrated by the following specific examples but is not intended to be limited thereto.

*Example 1*

A liquid mixture consisting of 45 parts trichloroethylene and 6 parts of an aqueous solution containing 9.6 percent by weight sodium dodecylbenzenesulfonate and 0.4 percent by weight methyl cellulose was pumped at a rate of 51 pounds per hour and at a pressure of 100 p.s.i. into the mixing zone of an extruder of the type described in U.S. 2,453,088, heated to a temperature of 107° C. An ethylene/ethyl acrylate copolymer containing 20 percent ethyl acrylate and having a melt index of 18.5 decig./min., a density of 0.929 g./cc. was fed at the rate of 10 pounds per hour to the metering pumping zone of the extruder which was heated to a temperature of 150° C. The extruder screw advanced the ethylene/ethyl acrylate copolymer feed to the mixing zone of the extruder where the copolymer was intimately mixed and dispersed in the liquid mixture. The dispersed copolymer was discharged through the heated orifice of the extruder at a temperature of 115° C. and a pressure of 75 p.s.i. into a continuous mixer where the dispersion was mixed while being cooled to a temperature of 83° C. for about 3 minutes. The continuous mixer was comprised of a jacketed, temperature controlled cylindrical barrel 30.5 inches long having an inside diameter of 3.6 inches. The barrel had disposed therein a generally cylindrical screw measuring 30 inches in length having a diameter of 3.5 inches. The screw had 8 threads equally spaced about the circumference and formed a helix angle of 35 degrees. The grooves in the screw had a semi-circular configuration and a 0.5 inch radius. The screw was rotated at 8.8 revolutions per minute. The dispersion was discharged from the mixer at 50 p.s.i. pressure. The dispersion product was found to contain 16.7 percent solids. The product was then passed to a centrifugal pump, stirred, and then passed to a solvent stripper kettle where it was heated to 70° C. to remove the trichloroethylene solvent. The resultant product was a stable dispersion containing dispersed therein 40 percent solids having a particle size of 0.30 micron as measured by light scattering techniques.

Example 2

The procedure of Example 1 was repeated with the exception that liquid mixture fed to the mixing zone of the extruder was comprised of 45 parts hexane and 6 parts of an aqueous solution containing 9.6 percent by weight sodium dodecylbenzenesulfonate and 0.4 percent by weight methyl cellulose. The feed rate of the liquid mixture was 25 pounds per hour.

The ethylene/ethyl acrylate copolymer was fed at the rate of 7 pounds per hour to the metering pumping zone of the extruder which was heated to a temperature of 150° C. The resultant dispersion after volatilization of the solvent contained 40% solids.

Example 3

The operating conditions of Example 2 were continued except that polyethylene having a density of 0.915 g./cc. and melt index of 2.5 decig./min. was introduced into the extruder directly after the copolymer of Example 1. The product obtained after allowing a sufficient time (i.e. about 15 to 30 minutes) for the polyethylene to clear the extruder of the copolymer feed, was diluted with water at the rate of 27 gallons per hour. After volatilization of the trichloroethylene solvent the resultant product was determined to be a stable dispersion having 40 percent solids content.

Example 4

The operating conditions of Example 3 were continued except that an ethylene/acrylic acid copolymer containing 9 percent acrylic acid having a density of 0.935 g./cc. and a melt index of 17 decig./min. was introduced into the extruder directly after the polyethylene of Example 3. The product obtained after allowing a sufficient time for the copolymer to clear the extruder of the polyethylene feed after dilution with water and subsequent volatilization of the trichloroethylene solvent was determined to be a stable dispersion having 30 percent solids content.

Example 5

The operating conditions of Example 4 were continued except that an ethylene/vinyl acetate copolymer containing 12 percent vinyl acetate having a density of 0.925 g./cc. and a melt index of 2.0 decig./min. was introduced into the extruder directly after the ethylene/acrylic acid copolymer of Example 4. The product obtained after allowing a sufficient time for the ethylene/vinyl acetate copolymer to clear the extruder of the ethylene/acrylic acid copolymer feed, after dilution with water and subsequent volatilization of the trichloroethylene solvent was determined to be a stable dispersion having 30 percent solids content.

In a manner similar to that described above, stable aqueous dispersions of high molecular weight polymers may be prepared by mixing, in a conventional plastics extrusion apparatus, the polymers and copolymers mentioned above such as polypropylene, polyisobutylene, and the like with a liquid mixture of an organic solvent such as trichloroethylene and benzene and an aqueous solution containing a dispersing agent such as sodium dodecylbenzenesulfonate and sodium lauryl polyethoxysulfate, followed, after sufficient cooling and mixing of the dispersion components, by volatilization of the organic solvent.

What is claimed is:
1. A process for preparing stable aqueous colloidal dispersions of solid high molecular weight polymers made from olefinically unsaturated hydrocarbons containing 2 to 10 carbon atoms and copolymers of said hydrocarbons with copolymerizable unsaturated monomers which comprises the steps of:
 (a) feeding the solid polymer which is to be dispersed into a multizone extruder having, in sequence, a zone for melting, pumping and metering the polymer, a mixing zone and a discharge zone;
 (b) melting, pumping and metering the polymer and continuously passing it to the mixing zone;
 (c) injecting into the mixing zone a pressurized liquid mixture consisting of a water-immiscible solvent for the polymer and an aqueous solution of an emulsifying agent in which mixture the ratio of aqueous solution to water immiscible solvent is from 1:4 to 1:10 by weight;
 (d) admixing the polymer, the water-immiscible solvent therefor, and the aqueous solution of emulsifier in the mixing zone in which the ratio of the liquid mixture to the polymer is from 2.5:1 to 6:1 by weight;
 (e) passing the resulting emulsion mixture through the discharge zone into a temperature control and mixing zone, further mixing the emulsion while maintaining the temperature at from about 70° to about 120° C. and then
 (f) volatilizing the water-immiscible solvent from the emulsion, leaving a colloidal dispersion of the solid polymer in aqueous medium.

2. The process of claim 1 wherein the liquid mixture is injected into the mixing zone of the extruder at a pressure from about 50 p.s.i. to about 2500 p.s.i.

3. The process of claim 1 wherein the liquid mixture is heated from about 90° to about 180° C. in the mixing zone of the extruder.

4. The process of claim 1 wherein the solvent for the polymer is trichloroethylene.

5. The process of claim 1 wherein the emulsifying agent is sodium dodecylbenzenesulfonate.

6. The process of claim 1 wherein the polymer to be dispersed is a copolymer of ethylene and ethyl acrylate.

7. The process of claim 1 wherein the polymer to be dispersed is polyethylene.

8. The process of claim 1 wherein the polymer to be dispersed is a copolymer of ethylene and acrylic acid.

9. The process of claim 1 wherein the polymer to be dispersed is a copolymer of ethylene and vinyl acetate.

References Cited

UNITED STATES PATENTS

| 2,313,144 | 3/1943 | Gomm | 260—29.6 |
| 2,951,054 | 8/1960 | Hess | 260—34.2 |

FOREIGN PATENTS 487,995   11/1952   Canada.

SAMUEL H. BLECH, *Primary Examiner.*

MURRAY TILLMAN, GEORGE F. LESMES,
*Examiners.*

W. J. BRIGGS, *Assistant Examiner.*